US008805928B2

(12) United States Patent
Potekhin et al.

(10) Patent No.: US 8,805,928 B2
(45) Date of Patent: Aug. 12, 2014

(54) CONTROL UNIT FOR MULTIPOINT MULTIMEDIA/AUDIO SYSTEM

(75) Inventors: Sergey Potekhin, Modeine (IL); Eran Knaz, Rishon LeZion (IL); Moshe Elbaz, Kiriat Bialik (IL); Eyal Leviav, Tel-Aviv (IL)

(73) Assignee: Polycom, Inc., San Jose, CA (US)

( * ) Notice: Subject to any disclaimer, the term of this patent is extended or adjusted under 35 U.S.C. 154(b) by 1795 days.

(21) Appl. No.: 10/144,561

(22) Filed: May 10, 2002

(65) Prior Publication Data

US 2002/0188731 A1 Dec. 12, 2002

Related U.S. Application Data

(60) Provisional application No. 60/290,138, filed on May 10, 2001.

(51) Int. Cl.
*G06F 15/16* (2006.01)
*H04L 12/66* (2006.01)
*H04L 12/18* (2006.01)
*H04L 12/46* (2006.01)
*H04L 29/06* (2006.01)

(52) U.S. Cl.
CPC ............ *H04L 12/66* (2013.01); *H04L 12/1813* (2013.01); *H04L 12/4625* (2013.01); *H04L 29/06027* (2013.01); *H04L 65/4038* (2013.01)
USPC ........................................................ 709/204

(58) Field of Classification Search
CPC . H04L 12/66; H04L 12/1813; H04L 12/4625; H04L 29/06027; H04L 65/4038
USPC ............ 709/204, 224, 227; 370/270; 379/207
See application file for complete search history.

(56) References Cited

U.S. PATENT DOCUMENTS

| 3,573,377 | A | 4/1971 | Anderson et al. |
| 3,612,767 | A | 10/1971 | Anderson et al. |

(Continued)

FOREIGN PATENT DOCUMENTS

| EP | 680190 A2 * | 4/1995 | .............. H04M 3/56 |
| EP | 0 669 749 | 8/1995 | |

(Continued)

OTHER PUBLICATIONS

International Search Report received in corresponding International Application No. PCT/US02/41778 dated Jul. 17, 2003.

(Continued)

*Primary Examiner* — Karen Tang
(74) *Attorney, Agent, or Firm* — Wong, Cabello, Lutsch, Rutherford & Brucculeri, L.L.P.

(57) ABSTRACT

The present invention is a system and a method for providing a control unit for a multipoint multimedia/audio conference that enables one or more participants to take part in more than one conference simultaneously. The control unit can operate in audio and/or video sections of an MCU and/or Management and Control System (MCS). The MCS, in an exemplary embodiment of the present invention, controls the participation of at least one participant in more than one conference simultaneously by using a Cross-Conference Database (CCDB). The MCU performs connection changes affecting which participants are associated with one or more conferences based on the information that is stored in the CCDB.

8 Claims, 6 Drawing Sheets

| Participant | Conference: C # \ B# | A B3 | B B1 | C B5 | D B4 | • • | • • | • • | X Bz |
|---|---|---|---|---|---|---|---|---|---|
| 1 (E) | C11 | N | S | | | • | • | • | |
| 2 (F) | C21 | S | N | | | • | • | • | |
| 3 (E) | C13 | N | S | (1) | | • | • | | |
| 4 (F) | C05 | S | N | | | • | • | • | |
| 5 (E) | C07 | N | S | | | • | • | • | |
| 6 (FE) | C06 | N | | | | • | • | • | |
| 7 (EF) | C17 | | N | | | • | • | • | |
| 8 | C08 | | | N | S | • | • | • | |
| 9 | C01 | | | N | S | • | • | • | |
| 10 | C10 | | | | N | • | • | • | |
| 11 | C04 | | | | N | • | • | • | |
| • | • | • | • | • | • | • | • | • | • |
| • | • | • | • | • | • | • | • | • | • |
| • | • | • | • | • | • | • | • | • | • |
| N | Cm | | | | | • | • | • | N |
| N+1 | Cl | | | | | • | • | • | N |
| N+2 | Ck | | | | | • | • | • | N |

204   206   202   200

(56) References Cited

U.S. PATENT DOCUMENTS

| | | |
|---|---|---|
| 3,649,761 A | 3/1972 | Bush |
| 3,854,010 A | 12/1974 | Yoshino et al. |
| 3,927,269 A | 12/1975 | Yoshino et al. |
| 4,058,769 A | 11/1977 | Alderman |
| 4,257,119 A | 3/1981 | Pitroda |
| 4,311,877 A | 1/1982 | Kahn |
| 4,351,062 A | 9/1982 | Yoshiya |
| 4,384,362 A | 5/1983 | Leland |
| 4,425,642 A | 1/1984 | Moses et al. |
| 4,544,804 A | 10/1985 | Herr et al. |
| 4,763,317 A | 8/1988 | Lehman et al. |
| 4,782,521 A | 11/1988 | Bartlett |
| 4,796,293 A | 1/1989 | Blinken et al. |
| 4,901,307 A | 2/1990 | Gilhousen et al. |
| 4,945,412 A | 7/1990 | Kramer |
| 4,995,071 A | 2/1991 | Weber et al. |
| 5,003,593 A | 3/1991 | Mihm, Jr. |
| 5,195,087 A | 3/1993 | Bennett et al. |
| 5,353,373 A | 10/1994 | Drogo de Iacovo et al. |
| 5,473,631 A | 12/1995 | Moses |
| 5,526,354 A | 6/1996 | Barraclough et al. |
| 5,530,699 A | 6/1996 | Kline |
| 5,572,247 A | 11/1996 | Montgomery et al. |
| 5,583,963 A | 12/1996 | Lozach |
| 5,598,429 A | 1/1997 | Marshall |
| 5,625,407 A | 4/1997 | Biggs et al. |
| 5,677,728 A | 10/1997 | Schoolman |
| 5,687,095 A | 11/1997 | Haskell et al. |
| 5,724,383 A | 3/1998 | Gold et al. |
| 5,724,416 A | 3/1998 | Foladare et al. |
| 5,758,079 A * | 5/1998 | Ludwig et al. ............ 709/204 |
| 5,761,239 A | 6/1998 | Gold et al. |
| 5,790,591 A | 8/1998 | Gold et al. |
| 5,835,129 A * | 11/1998 | Kumar ................ 348/14.09 |
| 5,841,763 A * | 11/1998 | Leondires et al. ........... 370/260 |
| 5,844,600 A | 12/1998 | Kerr |
| 5,855,502 A | 1/1999 | Truchsess |
| 5,886,734 A | 3/1999 | Ozone et al. |
| 5,894,321 A * | 4/1999 | Downs et al. ............. 348/14.09 |
| 5,914,940 A | 6/1999 | Fukuoka et al. |
| 5,916,302 A | 6/1999 | Dunn et al. |
| 5,983,192 A | 11/1999 | Botzko et al. |
| 5,983,261 A | 11/1999 | Riddle |
| 5,991,385 A | 11/1999 | Dunn et al. |
| 5,999,207 A | 12/1999 | Rodrigues et al. |
| 5,999,966 A | 12/1999 | McDougall et al. |
| 6,049,531 A | 4/2000 | Roy |
| 6,088,347 A | 7/2000 | Minn et al. |
| 6,088,368 A | 7/2000 | Rubinstain et al. |
| 6,108,327 A | 8/2000 | Schilling et al. |
| 6,111,936 A | 8/2000 | Bremer |
| 6,130,880 A | 10/2000 | Naudus et al. |
| 6,134,223 A | 10/2000 | Burke et al. |
| 6,154,524 A | 11/2000 | Bremer |
| 6,170,011 B1 | 1/2001 | Macleod Beck et al. ..... 709/224 |
| 6,178,237 B1 | 1/2001 | Horn |
| 6,185,285 B1 * | 2/2001 | Relyea et al. ............. 379/204.01 |
| 6,192,395 B1 * | 2/2001 | Lerner et al. ............... 709/204 |
| 6,202,084 B1 | 3/2001 | Kumar et al. ............... 709/204 |
| 6,208,372 B1 | 3/2001 | Barraclough |
| 6,230,197 B1 | 5/2001 | Beck et al. ................. 709/223 |
| 6,272,176 B1 | 8/2001 | Srinivasan |
| 6,327,567 B1 * | 12/2001 | Willehadson et al. ........ 704/270 |
| 6,345,047 B1 | 2/2002 | Regnier |
| RE37,802 E | 7/2002 | Fattouche et al. |
| 6,421,355 B1 | 7/2002 | Quiring et al. |
| 6,442,190 B1 | 8/2002 | Nguyen |
| 6,453,022 B1 | 9/2002 | Weinman, Jr. |
| 6,453,336 B1 | 9/2002 | Beyda et al. |
| 6,501,739 B1 | 12/2002 | Cohen |
| 6,501,740 B1 * | 12/2002 | Sun et al. ............. 370/261 |
| 6,580,789 B1 | 6/2003 | Simpson et al. |
| 6,584,138 B1 | 6/2003 | Neubauer et al. |
| 6,597,667 B1 | 7/2003 | Cerna |
| 6,628,644 B1 | 9/2003 | Nelson et al. |
| 6,628,768 B1 | 9/2003 | Ramaswamy et al. |
| 6,661,833 B1 | 12/2003 | Black et al. |
| 6,671,263 B1 * | 12/2003 | Potter et al. .................. 370/261 |
| 6,728,222 B1 | 4/2004 | Ono |
| 6,728,367 B1 | 4/2004 | Swam |
| 6,731,609 B1 | 5/2004 | Hirni et al. |
| RE38,523 E | 6/2004 | Ozluturk |
| 6,765,895 B1 | 7/2004 | Watanabe |
| 6,792,092 B1 | 9/2004 | Michalewicz |
| 6,798,753 B1 | 9/2004 | Doganata et al. |
| 6,810,116 B1 | 10/2004 | Sorensen et al. |
| 6,812,955 B2 | 11/2004 | Takaki et al. |
| 6,885,652 B1 | 4/2005 | Ozukturk et al. |
| 6,888,935 B1 | 5/2005 | Day |
| 6,898,620 B1 * | 5/2005 | Ludwig et al. ................ 709/204 |
| 6,940,826 B1 | 9/2005 | Simard et al. |
| 7,003,042 B2 | 2/2006 | Morelos-Zaragoza et al. |
| 7,006,456 B2 | 2/2006 | Rabipour et al. |
| 7,006,616 B1 | 2/2006 | Christofferson et al. |
| 7,107,312 B2 | 9/2006 | Hackbarth et al. |
| 7,185,054 B1 | 2/2007 | Ludwig et al. |
| 7,221,663 B2 | 5/2007 | Rodman et al. |
| 7,227,938 B2 | 6/2007 | Rodman et al. |
| 7,302,050 B1 | 11/2007 | Michalewicz |
| 7,339,605 B2 | 3/2008 | Rodman et al. |
| 7,386,026 B1 | 6/2008 | Gold |
| 7,428,223 B2 | 9/2008 | Nierhaus et al. |
| 7,526,078 B2 | 4/2009 | Rodman et al. |
| 2001/0008556 A1 | 7/2001 | Bauer et al. |
| 2001/0016038 A1 | 8/2001 | Sammon et al. |
| 2001/0033613 A1 | 10/2001 | Vitenberg |
| 2001/0043571 A1 | 11/2001 | Jank et al. |
| 2002/0018117 A1 | 2/2002 | Tosaya |
| 2002/0034166 A1 | 3/2002 | Barany et al. |
| 2002/0083462 A1 | 6/2002 | Arnott |
| 2002/0093985 A1 | 7/2002 | Nimmagadda |
| 2002/0097679 A1 | 7/2002 | Berenbaum |
| 2002/0122429 A1 | 9/2002 | Griggs |
| 2002/0131377 A1 | 9/2002 | DeJaco et al. |
| 2002/0151294 A1 | 10/2002 | Kirby et al. |
| 2003/0016676 A1 | 1/2003 | Allen et al. |
| 2003/0048353 A1 | 3/2003 | Kenoyer et al. |
| 2003/0053443 A1 | 3/2003 | Owens |
| 2003/0112947 A1 | 6/2003 | Cohen |
| 2003/0114122 A1 | 6/2003 | Strakovsky |
| 2003/0123645 A1 | 7/2003 | Comisky |
| 2003/0142635 A1 | 7/2003 | Royer et al. |
| 2003/0179859 A1 | 9/2003 | Chea et al. |
| 2004/0003045 A1 | 1/2004 | Tucker et al. |
| 2004/0012669 A1 | 1/2004 | Drell et al. |
| 2004/0022272 A1 | 2/2004 | Rodman et al. |
| 2004/0125932 A1 | 7/2004 | Orbach et al. |
| 2004/0213474 A1 | 10/2004 | Kato |
| 2005/0014491 A1 | 1/2005 | Johnson |
| 2005/0018756 A1 | 1/2005 | Nuytkens et al. |
| 2005/0157777 A1 | 7/2005 | Mizuno |
| 2005/0185602 A1 | 8/2005 | Simard et al. |
| 2005/0212908 A1 | 9/2005 | Rodman et al. |
| 2005/0213517 A1 | 9/2005 | Rodman et al. |
| 2005/0213725 A1 | 9/2005 | Rodman |
| 2005/0213726 A1 | 9/2005 | Rodman et al. |
| 2005/0213728 A1 | 9/2005 | Rodman et al. |
| 2005/0213729 A1 | 9/2005 | Rodman et al. |
| 2005/0213730 A1 | 9/2005 | Rodman et al. |
| 2005/0213731 A1 | 9/2005 | Rodman et al. |
| 2005/0213732 A1 | 9/2005 | Rodman |
| 2005/0213733 A1 | 9/2005 | Rodman et al. |
| 2005/0213734 A1 | 9/2005 | Rodman et al. |
| 2005/0213735 A1 | 9/2005 | Rodman et al. |
| 2005/0213736 A1 | 9/2005 | Rodman et al. |
| 2005/0213737 A1 | 9/2005 | Rodman et al. |
| 2005/0213738 A1 | 9/2005 | Rodman et al. |
| 2005/0213739 A1 | 9/2005 | Rodman et al. |
| 2005/0232166 A1 | 10/2005 | Nierhaus |
| 2005/0254558 A1 | 11/2005 | Charles Dutka |
| 2005/0281319 A1 | 12/2005 | Schilling |
| 2006/0098692 A1 | 5/2006 | D'Angelo |
| 2006/0109890 A1 | 5/2006 | Willenegger |

(56) References Cited

U.S. PATENT DOCUMENTS

| | | | |
|---|---|---|---|
| 2006/0222155 A1 | 10/2006 | Summers et al. | |
| 2008/0144701 A1 | 6/2008 | Gold | |
| 2009/0132391 A1 | 5/2009 | Jacobs | |

FOREIGN PATENT DOCUMENTS

| | | | |
|---|---|---|---|
| EP | 0 680 190 | 11/1995 | |
| EP | 0 680 190 A2 | 11/1995 | |
| EP | 1 006 706 | 7/2003 | |
| EP | 1 006 706 A3 | 7/2003 | ............. H04M 3/56 |
| JP | 05300509 | 12/1993 | |
| JP | 05300509 A | 12/1993 | |
| JP | 08125738 | 5/1996 | |
| JP | 10042264 | 2/1998 | |
| RU | 2 096 921 | 11/1997 | |
| RU | 2 096 921 C1 | 11/1997 | ............. H04M 3/56 |
| WO | 94/18779 | 8/1994 | |
| WO | 94/18779 A1 | 8/1994 | |
| WO | 98/19458 | 5/1998 | |
| WO | 99/12351 | 3/1999 | |
| WO | WO 99/12351 | 3/1999 | ............. H04M 7/14 |

OTHER PUBLICATIONS

Search Report received in corresponding European Application No. 03743750.6-2414—PCT/US0306698 dated Mar. 16, 2005.

Search Report received in corresponding European Application No. 03726026.2-2414—US0306736 dated Mar. 10, 2005.

International Search Report received in corresponding International Application No. PCT/US01/51636 dated Sep. 26, 2001.

Mermeistein P.; "G.722, A New CCITT Coding Standard for Digital Transmission of Wideband Audio Signals;" IEEE Communications Magazine; 26(1) Jan. 1988; pp. 8-15.

Mermeistein; "G.722, A New CCIT Coding Standard for Digital Transmission of Wideband Audio Signals;" IEEE Communications Magazine; Jan. 1988—vol. 26, No. 1.

Schulzrinne; "Voice Communication Across the Internet: A Network Voice Terminal;" 1992, pp. 1-34, Amherst, MA.

Haojun; "Implementing an Audio Multipoint Processor on DSP Array;" 2001, pp. 441-444.

Jung; "The Multimedia Desktop Conference System Adaptability in Network Traffic on LAN;" 1995; pp. 334-338, IEEE.

Noore; "Computer-Based Multimedia Video Conferencing System;" 1993; pp. 587-591.

Sasse; "Workstation-Based Multimedia Conferencing: Experiences from the MICE Project;" 1994; pp. 1-6.

User's Guide Adminstrator's guide, SoundStation(R) VTX 1000 Operation Manual, (c)2003 Polycom, Inc.

Quick Installation Guide, Vortex(R)—Soundstation VTX 1000TM, (c)2004, Polycom, Inc.

J. Rodman, Polycom(R), White Paper—"The Power of Shared Resources: Conference Room Integration in the VTX/VSX Environment" Jun. 2, 2004, pp. 1-6.

J. Rodman, Polycom(R), White Paper—"The Distributed Dawn: the Emergence of Versatile Performance in the Conferencing Environment" Jun. 2, 2004, pp. 1-7.

H324 Videophones Standard; http://www.elextronika.com/tvphone/h324.htm; Retrieved Mar. 14, 2005; 4 pages.

International Telecommunication Union; ITU-T Telecommunication Standardization Sector of ITU H.234 (Mar. 2002) Series H: Audiovisual and Multimedia Systems Infrastructure of Audiovisual services—Systems and terminal equipment for audiovisual services Terminal for low bit-rate multimedia Communication; ITU-T Recommendation H.324.

MultiTech(R) Systems; MultiModernDSVD Compact DSVD Modems; http://www.multitech.com/Products/Families/MultiModernDSVD; obtained Mar. 14, 2005.

DSVD and H324 Standards; TechOnLine—Modern and Fax Standards and Software; http://www.techonline.com/community/ed_resource/feature_article/20041; Obtained Mar. 24, 2005.

Hering, et al.; "Safety and Security Increases for Air Traffic Management Through Unnoticeable Watermark Aircraft Identification Tag Transmitted with VHF Voice Communication" pp. 1-10; © 2003 IEEE.

CDMA Overview, Resources/Tutorials; http://www.telecomspace.com/cdma.html; Retrieved Sep. 24, 2006; 5 pages.

Spread spectrum—Wikipedia, the free encyclopedia; http://en.wikipedia.org/wiki/Spread_spectrum; retrieved Sep. 24, 2006; 4 pages.

Search Report received in corresponding European Application No. EP 02 72 8007 dated Sep. 26, 2006.

English Translation of Office Action of Japan Patent Office, Patent Application No. 2002-587986, dated Oct. 30, 2007.

* cited by examiner

| Participant | Conference:<br>C # \ B# | A<br>B3 | B<br>B1 | C<br>B5 | D<br>B4 | • | • | • | X<br>Bz |
|---|---|---|---|---|---|---|---|---|---|
| 1 (E) | C11 | N | S | | | • | • | • | |
| 2 (F) | C21 | S | N | | | • | • | • | |
| 3 (E) | C13 | N | S | | (1) | • | • | | |
| 4 (F) | C05 | S | N | | | • | • | • | |
| 5 (E) | C07 | N | S | | | • | • | • | |
| 6 (FE) | C06 | N | | | | • | • | • | |
| 7 (EF) | C17 | | N | | | • | • | • | |
| 8 | C08 | | | N | S | • | • | • | |
| 9 | C01 | | | N | S | • | • | • | |
| 10 | C10 | | | | N | • | • | • | |
| 11 | C04 | | | | N | • | • | • | |
| • | • | • | • | • | • | • | • | • | • |
| • | • | • | • | • | • | • | • | • | • |
| • | • | • | • | • | • | • | • | • | • |
| N | Cm | | | | | • | • | • | N |
| N+1 | Cl | | | | | • | • | • | N |
| N+2 | Ck | | | | | • | • | • | N |

FIG. 2

CONTROL UNIT FOR MULTIPOINT MULTIMEDIA/AUDIO SYSTEM

CROSS REFERENCE TO RELATED APPLICATIONS

This application claims priority benefit of U.S. Provisional Application Ser. No. 60/290,138, entitled "CONTROL UNIT FOR MULTIPOINT MULTIMEDIA/AUDIO," filed May 10, 2001 by Sergey Potekhin, Eran Knaz, and Moshe Elbaz.

BACKGROUND OF THE INVENTION

1. Field of the Invention

The present invention relates generally to conferencing systems, and more particularly to a control unit for a multi-point audio and or multimedia conference.

2. Description of Prior Art

In current audio conferences or videoconferences, a participant is an entity that can participate in a single conference (i.e., the participant can speak or listen to the same conference). However, often a participant needs to speak to one group but during the same time, may need to listen to another group.

An example for such a need is a conference with two groups of people who don't speak the same language and need translators. For instance, a scenario with a group of English speaking individuals, E1 to En, a second group of French speaking individuals, F1 to Fm, a translator from English to French (EF) and a translator for French to English (FE). In such a case, the participants of the conference may desire to have the following conferences: conference A with participants E1 to En, F1 to Fm, and FE and conference B with participants E1 to En, F1 to Fm, and EF.

The French-speaking individual may want to listen to conference B and the English speaking individuals may want to listen to Conference A. As a result, only the English speaking individuals will hear the FE translator, and the French speaking individuals will hear the EF translator. Another example in which participants of a conference may desire to have more than one conference is if some of the participants want a "Private Room" in which a first group of participants can hear a second group of participants, while chatting among themselves without being heard by the second group of participants.

An Multipoint Control Units (MCU) is a conference controlling entity. the MCU may be a piece of equipment located in a node of the network or in a terminal that receives several channels from access ports and, according to certain criteria, processes audiovisual signals and distributes them to connected channels. An example of an MCU is MGC-100, which is available from Polycom, Inc. The MCU for audio/multimedia conference may receive channels according to H.320 (an International Telecommunications Union (ITU) standard), H.323 (an ITU standard), Session Initiation Protocol (SIP) or similar protocol, process the audio signals and distribute them to connected channels, and may be used for controlling a conference. However, current MCUs cannot fulfill the needs of those individuals desiring multiple conferences such as the examples given above.

Therefore, it is evident that there is a need for a system and a method, which enables one or more participants to take part in more than one conference.

SUMMARY OF THE INVENTION

The present invention provides a system and a method for controlling an audio or multimedia conference that enables each participant to participate in more than one conference. The present invention may operate in an audio section and in a Management and Control System (MCS) section of an MCU.

In the present invention, a bridge may be a logical unit that is identified with a conference. The bridge may include a stream analyze and enhance logical unit, a control unit, a switch, and a mixer. The analyze and enhance logical unit may include a set of algorithms analyzing an audio stream of a participant and enhancing its quality. The analysis and enhancement may include, but is not limited to, ITU G.165 (Echo canceling), DTMF suppression, Voice Activity Detection (VAD), for example. The control unit may be a main control unit for the conference, and may receive all information signals from the stream analyze and enhance logical units. The control unit may select the participants that will be routed for mixing. The switch may be a selector that receives the decoded streams from all the participants in a conference and transfer the selected streams to a mixer. The selection is based on the decisions of the control unit. The mixing unit receives the streams from all of the selected participants and supplies each participant with an uncompressed mixed audio stream from the selected participants. A connection parameter may indicate resources that are allocated to each participant and to each conference. For example, the connection parameter may be a parameter related to a codec that is associated with the participant, and/or a bridge that is associated with the conference. In course of the description, words such as compress and encode may used interchangeably. Similarly, as the phrases decode, uncompress and open data may be used interchangeably.

Further in the present invention, a Cross-Conference Database (CCDB) may be a management tool that enables participation of at least one participant in two or more conferences simultaneously. The CCDB is a database that holds connection statuses of each participant in all the conferences that are currently managed by the MCU and/or the connection parameters of all the conferences and/or all the participants that are currently connected to the MCU. The connection status may define the status of the participant in a conference. Some examples of connection statuses are Normal, Mute, Force, Speak, Listening, and None. The Mute (M) connection status may mean that the participant cannot be heard in the conference. The Normal (N) connection status may mean that the participant can be heard and can listen to the conference. The Speak (S) connection status may mean that a participant can be heard in the conference but cannot listen to the conference. Optionally, for an N and/or S connection status the participant may be heard only if the signal representing the participant's voice meets certain criteria such as whether the energy level is above a certain value. The Force (F) connection status may mean that the participant must be heard in the conference even if the corresponding participant's voice does not meet the criteria for being heard. The F connection status may also allow the participant to listen to the conference. The Exclusive (E) connection status may mean that the participant is the only one that can be heard in the conference. The Listening (L) or Mute (M) connection status may mean that the participant can listen to the conference without speaking. Finally, the None connection status may mean that the participant has no relations to this conference.

The MCS of the present invention may control the participation of at least one participant in more than one conference by using the Cross Conference Database (CCDB). The MCU may perform connection changes of participants or conferences based on information that is stored in the CCDB. A connection change may be any change in the current situation. A connection change can be, for example, the start of a conference, the termination of a conference, the addition of a participant to the conference, or the muting of a participant. The CCDB can be implemented in a single database or in several databases. For example, there may be a database for each participant that may include the connection status and/or the connection parameters of that participant in every conference that is currently controlled and/or managed by the MCU. As another example, there may be a database for each conference that is currently controlled by the MCU, where the database may include the connection status of all of the participants in the conference and/or the connection parameters of the conference.

In one embodiment, the MCS may have one or more routines that manage the effect of changes in one conference on some of or all of the other conferences, and/or the effect of changes in the connection status of one participant on some of or all of the conferences. In this application, an encoder may be an enhancement and encoding logical unit, compressing the audio signal for participants, based on the communication standard, such as, but not limited to, G.723.1, G.728, G.729, or MPEG. A decoder may be a logical unit for decoding a compressed audio stream, based on the communication standards like but not limited to: G.723.1, G.728, G.729, MPEG. The word "codec" refers to a unit that may be a logical unit and includes a decoder or decoding section and an encoder or encoding section. Also in this application, the word "bridge" refers to a unit, which may be a logical unit, that is associated with the conference. The audio section of an embodiment of the present invention has an architecture that enables multicasting decoded output from each participant's codec to the bridges of all the conferences. Moreover, the audio section may enable routing of the output of any bridge or any of a group of bridges to any participant or any of a group of participants.

Other objects, features, and advantages of the present invention will become apparent upon reading the following detailed description of the embodiments with the accompanying drawings and appended claims.

BRIEF DESCRIPTION OF THE DRAWINGS

FIG. 2 is an example of a Cross-Conferences Database (CCDB);

DESCRIPTION OF EXEMPLARY EMBODIMENTS

Figure 1A:
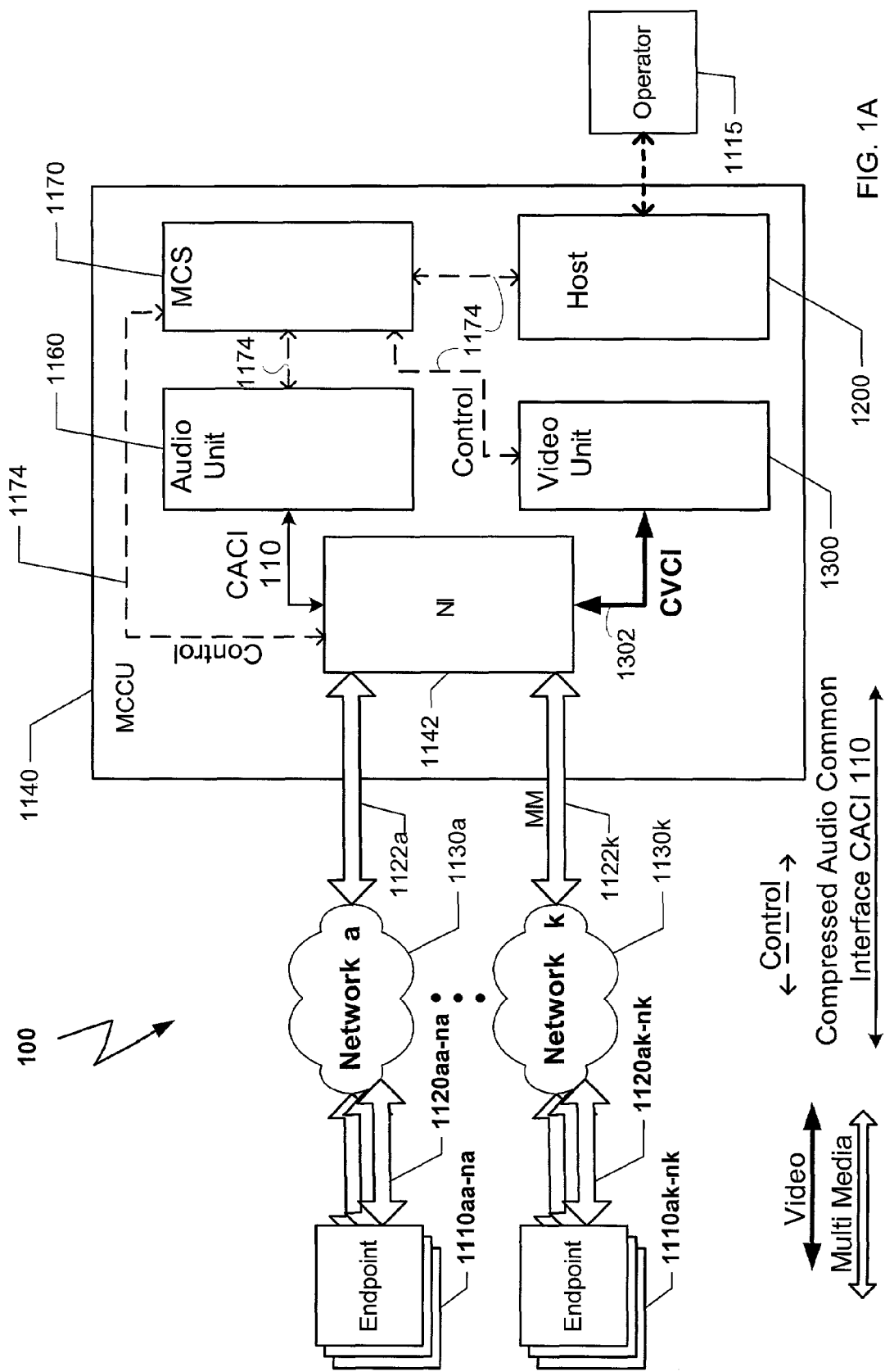
FIG. 1A is a block diagram showing a conference environment.

Referring now to the drawings, in which like numerals refer to like parts throughout the several views, exemplary embodiments of the present invention are described.

FIG. 1A is an exemplary block diagram illustrating a general description of a conference environment 100 having endpoints 1110aa-nk, operator 1115, multimedia signals 1120aa-nk, multimedia signals 1122a-k, networks 1130a-k, and Multimedia Conference Control Unit (MCCU) 1140. In one exemplary embodiment, the MCCU 1140 may include a Network Interface (NI) 1142, Compressed Audio Common Interface (CACI) 110, audio unit 1160, Management and Control System (MCS) 1170, control signals 1174, a host 1200, and video unit 1300. Other exemplary embodiments may not have a video section and may be used for audio conferences only.

The pluralities of endpoints 1110aa-nk are connected via the plurality of networks 1130a-k to the MCCU 1140. The MCCU 1140 may be an MCU, or an audio only multipoint control unit (an audio bridge), for example. The MCCU 1140 and/or some or all of its components are logical units that may be implemented by hardware and/or software. The MCS 1170 may be a control module and may be a logical unit that controls the operation of the MCCU 1140.

An endpoint is a terminal on a network, capable of providing one way or two-way audio and/or visual communication with other terminals or with the MCCU 1440. The information communicated between the terminals and/or the MCCU 1440 may include control signals 1174, indicators, audio information, video information, and data. A terminal may provide any combination of several different types of inputs and/or outputs, such as speech only, speech and data, a combination of speech and video, or a combination of speech, data, and video.

The NI 1142 receives multimedia communications 1122a-k via a plurality of networks 1130a-k and multimedia signals 1120aa-nk from the plurality of the endpoints 1110aa-nk, and processes the multimedia communication according to communication standards that are used by each type of network, such as, but not limited to, H.323, H.321, SIP, and/or H.320. The NI 1142 then delivers compressed audio, compressed video, compressed data, and control streams to appropriate logical modules in the MCCU 1140. Some communication standards require that the process of the NI 1142 include demultiplexing the incoming multimedia communication into compressed audio, compressed video, compressed data and control streams. In the opposite direction, the NI 1142 receives the separate streams from the various units (e.g., the MCS 1170, audio unit 1160, and/or video unit 1300) and processes the streams according to the appropriate communication standard. The NI 1142 then transmits the streams to the appropriate network 1130a-k.

The audio unit 1160 receives the compressed audio streams of the plurality of endpoints 1110aa-nk via the NI 1142 and CACI 110, processes the audio streams, mixes the relevant audio streams, and sends the compressed mixed signal via the Compressed Audio Common Interface (CACI) 110 and the NI 1142 to the endpoints 1110aa-nk. Audio unit 1160 may be a logical unit and is described below in conjunction to FIG. 1B.

The video unit 1300 may be a logical unit that receives and sends compressed video streams. The video unit 1300 includes at least one video input module that handles an input portion of a video stream 1302 from a participating endpoint and at least one video output module that generates a composed compressed video output stream that is sent via Compressed Video Common Interface (CVCI) 1302 to NI 1142 and from there to the designated endpoints 1110aa-nk.

The uncompressed video data is shared by input and output modules on a common interface such as, but not limited to, Time Division Multiplexing (TDM), Asynchronous Transfer Mode (ATM), and/or shared memory. The data on the common interface may be fully uncompressed or even partially compressed. An exemplary operation of such a video unit is described in U.S. Pat. No. 6,300,973, which is incorporated herein by reference.

Preferably, the host 1200 communicates with the operator 1115 of the MCCU 1140, where the operator 1115 may have an operator's station for communicating with the host 1200. The host 1200 controls the MCCU 1140 via the MCS 1170 according to instructions from the operator 1115.

Figure 1B:
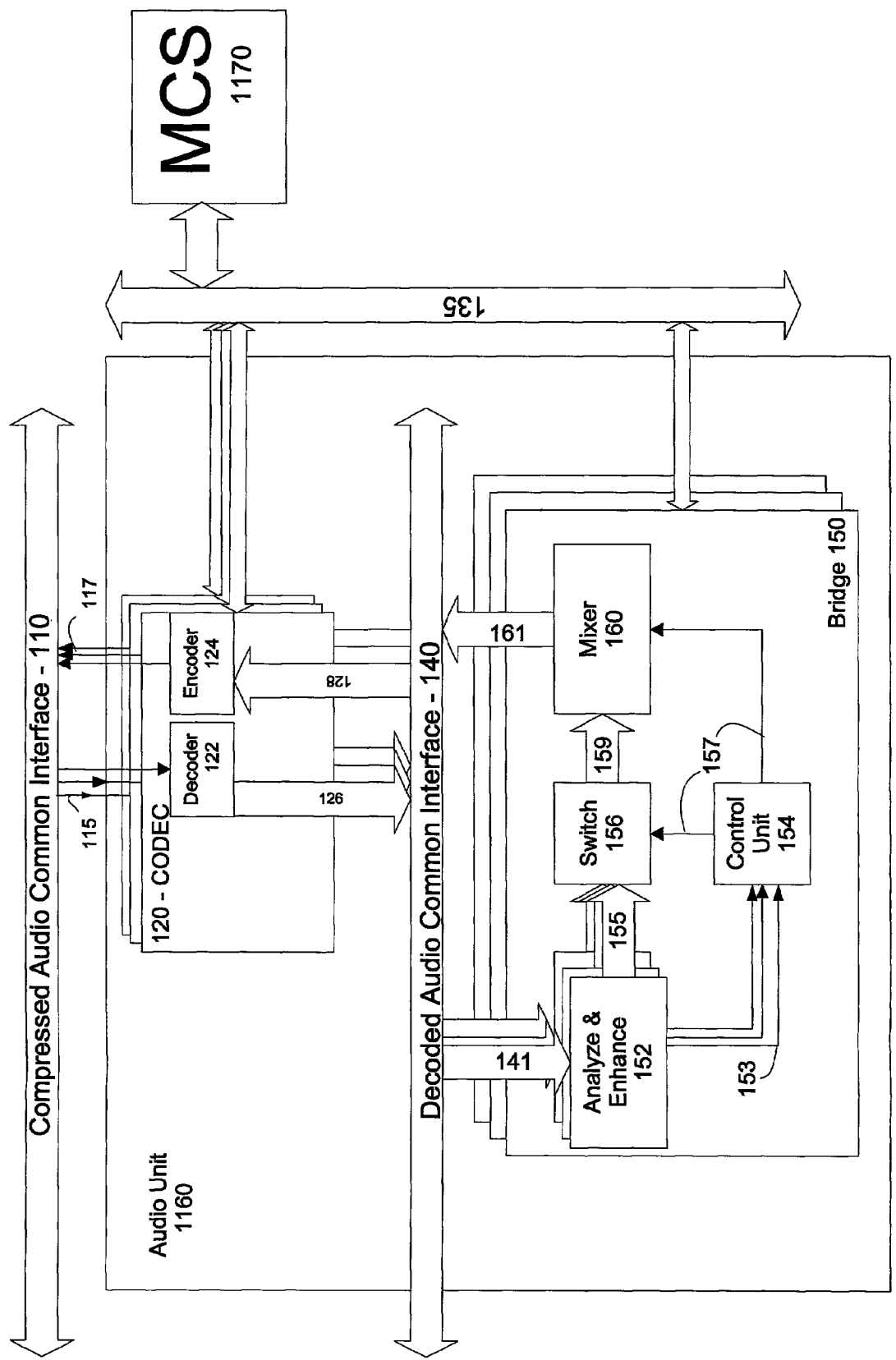
FIG. 1B is a block diagram of an embodiment of the invention including a general description of an audio unit.

FIG. 1B is an exemplary block diagram of an embodiment of the invention including a general description of audio unit 1160. The embodiment of FIG. 1B includes a Compressed Audio Common Interface (CACI) 110, a control bus 135, MCS 1170, and audio unit 1160 having compressed signals 115 and 117, codec 120, decoded information 126, mixed output 128, Decoded Audio Common Interface (DACI) 140, and bridge 150. The codec 120 includes a decoder 122 and an encoder 124, while the bridge 150 includes analyze and enhance unit 152, information signal 153, control unit 154, switch 156, control signals 157, selected signals 159, mixer 160, and mixed signal 161. FIG. 1B describes the flow of an audio streams in one example of the present invention. Compressed audio streams, from all endpoints that are connected to an MCU are transferred over the Compressed Audio Common Interface (CACI) 110. The MCS 1170 allocates the codec 120 to one of the endpoint 1110*aa-nk* (FIG. 1A).

Further, the CACI 110 carries signals to and from endpoints 1110*aa-nk*. For example, the compressed signal 115 from one of the endpoint 1110*aa-nk* is routed through the CACI 110 to the decoder 122 in the codec 120, which was previously allocated to that endpoint by the MCS 1170 via control bus 135. The decoder 122 may be a logical unit and may decode a compressed audio stream, based on the communication standards such as, but not limited to, G.723.1, G.728, G.729, MPEG. The decoder 122 then decodes the compressed audio stream, such as compressed signal 115, and broadcasts the decoded signal 126 over the Decoded Audio Common Interface (DACI) 140. The DACI 140 is a bus that may have broadcasting capabilities. The DACI 140 may be implemented for example by any one of or any combination of Time Division Multiplexing (TDM), Asynchronous Transmission Mode (ATM), Local Area Network (LAN), wireless technology, or shared memory. The bridge 150 may then grab the decoded signal from the DACI 140 and may analyze, enhance, and/or mix the decoded signal and return the output 161 to the DACI 140.

The encoder 124 may be a logical unit and may be an enhancement and/or encoding unit. The encoder 124 may compress the output 128 of the appropriate bridge 150 forming a compressed audio stream, such as the compressed signal 117, based on the communication standard such as, but not limited to, G. 723.1, G.728, G.729, and/or Motion Picture Expert Group (MPEG).

The MCS 1170 generates a Cross-Conferences Database (CCDB) based on the required setup of all the participants and all the conferences that currently exist in the MCU. The CCDB is a Cross-Conference Database that holds the connection parameters (e.g., codecs and bridges, etc.) and the connection status (e.g., Normal, Mute etc.) of each endpoint (participant) that is currently connected to the MCU, in every conference that is currently managed by the MCU. The CCDB enables the participation of at least one participant in more than one conference. The CCDB is described below in conjunction with FIG. 2. According to the CCDB, the MCS 1170 programs one or more bridges 150 to grab from the DACI 140 the decoded signals of all the participants associated with a conference that is assigned to those bridges 150.

The decoded output of any codec 120 can be grabbed by more than one bridge 150 allowing the participants to be associated with more than one conference. The decoded streams from the decoders 122 on the DACI 140 may be grabbed by the bridge 150 and then analyzed and enhanced by the analyze and enhance unit 152. The analyze and enhance unit 152 may be a logical unit, and may include a set of algorithms for analyzing an audio stream of a participant and/or enhancing its quality, such as, but not limited to, International Telecommunications Union (ITU) G.165 (echo canceling), Dual Tone Multi-Frequency (DTMF) suppression, and/or Voice Activity Detector (VAD).

The bridge 150 may have one or more analyze and enhance units 152. Each analyze and enhance unit 152 is assigned to a single participant and is programmed according to the connection status of that participant in the conference. The control unit 154 controls a conference that receives all signals from the analyze and enhance unit 152 and selects the participants that will be routed via switch 156 to the mixer 160. The mixer 160 receives the enhanced streams from all of the selected participants and supplies each participant with an uncompressed mixed audio stream of the selected participants. Signals from the analyze and enhance unit 152 are sent to the control unit 154 and the enhanced decoded audio signals are sent from the analyze and enhance units 152 to the switch unit 156. The switch unit 156 is a selector that receives the decoded streams from all the participants in a conference and transfers the selected streams to the mixer 160. The selection is based on the decisions of the control unit 154. Based on received commands from the MCS 1170, which define the connection status of the participants in the conference that is assigned to the bridge 150, and the information signal 153 from the analyze and enhance unit 152 the control unit 154 controls, via control signals 157, the switch 156, and the mixer 160. For example, in a case where a participant's connection status is Normal (N), the analyze and enhance unit 152 that is associated with that participant may indicate that the voice signal meets a certain criteria such as set forth by VAD, (e.g., such as the energy level being above a certain value). Then, the control unit 154 via switch 156 selects the output of the analyze and enhance unit 152, which is assigned to the participant, as one of the inputs to the mixer 160. The mixer 160 mixes the selected audio signals to form the mixed signal 161, and broadcasts the mixed signal 161 over the DACI 140. Some embodiments of the bridge 150 have the capability of eliminating the voice of a speaker from the mixed signal that is aimed to the endpoint of that speaker.

The MCS 1170, based on the connection status stored in the CCDB, commands one or more codecs 120 to grab the mixed output 128 from the DACI 140 for listening to the conference. After grabbing the mixed output 128 from the DACI 140, the encoder 124 encodes the decoded signal from the appropriate bridge 150, and sends the compressed signal 117 via the CACI 110 to the appropriate participant.

The codecs 120 and the bridges 150 may be implemented by Digital Signal Processors (DSPs) such as, but not limited to, Texas Instruments DSP, TMS320C31. One DSP can include more than one unit (e.g., more than one codec and/or bridge). In the above example, the codec 120 handles a single participant's audio signal, and the bridge 150 handles one conference.

Figure 1C:
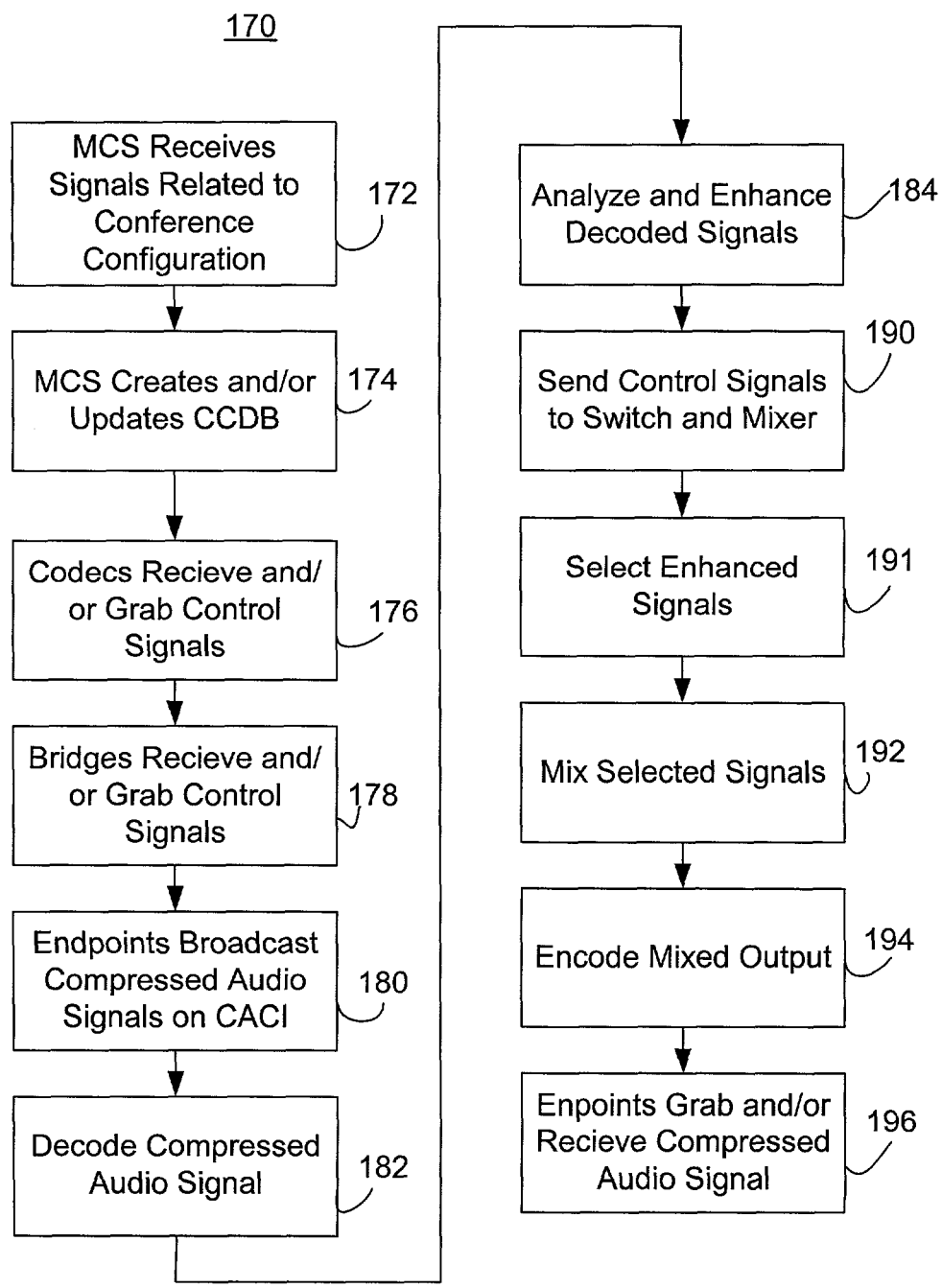
FIG. 1C is a flowchart of a method of operation for the embodiment of FIG. 1B.

Referring now to FIG. 1C, a flowchart depicting a method 170 for the operation of the system of FIG. 1B is shown. In the method 170, the mixed signal representing the conference is broadcasted back to the endpoints 1110*a-n* (FIG. 1A). Specifically, the method 170 starts with step 172 in which the MCS 1170 (FIG. 1A) receives signals from the host 1200 (FIG. 1A) or from one or more endpoints 11110*a-n* (FIG. 1A) related to the configuration of the conference or conferences in progress or that needs to be initiated. The endpoints 11110*aa-nk* communicate with the MCS 1170 indirectly by sending multimedia signals 1120*a-n* (FIG. 1A) to networks a-k which in turn send multimedia signals 1122*aa-nk* (FIG. 1A) to the NI 1142 (FIG. 1A). Then, the NI 1142 responds to the multimedia signals 1122*a-k* by sending control signal 1174 to the MCS 1170 to set up the conference. In one embodiment, the audio unit 1160 (FIG. 1A) and/or the video unit 1300 (FIG. 1A) may send control signals to the MCS 1170 for setting up the conference in addition to or instead of the control signals 1174 (FIG. 1A).

Next, in step 174, the MCS 1170 creates and/or updates one or more CCDBs in which the information about how the conferences are to be setup is stored, and broadcasts control signals on the control bus 135 (FIG. 1B). Subsequently, the codecs 120 (FIG. 1B) receive and/or grab control signals from control bus 135 associating individual codecs 120 with endpoints and/or participants according to the configuration of the conferences in the CCDB in step 176. Then, in step 178, the bridges 150 (FIG. 1B) grab and/or receive control signals from the control bus 135 associating each analyze and enhance unit 152 with an endpoint and/or participant. Next, compressed audio signals from one or more endpoints are placed or broadcasted on the CACI 110 (FIG. 1B) in step 180. Subsequently in step 182, the corresponding decoder 122 (FIG. 1B) of the codec 120 may grab and/or receive the compressed signal 115 (FIG. 1B) from the CACI 110 and decodes the compressed signal 115 to produce the decoded signal 126 (FIG. 1B) and broadcasts the decoded signal 126 on the DACI 140 (FIG. 1B).

Subsequently, in step 184, the analyze and enhance unit 152 (FIG. 1B) grabs and/or receives the decoded signal 141 (FIG. 1B) (which may be derived from the decoded signal 126) from the DACI 140 according to control signals from the MCS 1170, which is driven from CCDB (step 174). Also, in step 184, the analyze and enhance unit 152 enhances the decoded signal 141 to form the enhanced signal 155 (FIG. 1B), and extracts the control information 153 (FIG. 1B). The enhanced signal 155 is then sent to the switch 156 (FIG. 1B), and the control information 153 is sent to the control unit 154 (FIG. 1B).

The control unit 154 produces control signals 157 (FIG. 1B) based upon control signals from the MCS 1170 (which are driven from CCDB in step 174) and/or control information 153 in step 190. Based on the control signal 157 and/or control signals from the MCS 1170, the switch 156 selects which enhanced signals 155 are sent as selected signals 159 (FIG. 1B) to the mixer 160 (FIG. 1B) in step 191. In response, in step 192, the mixer 160 mixes the selected signals 159 to form the mixed signal 161 (FIG. 1B) according to control signals from the MCS 1170 and broadcasts the mixed signal 161 onto the DACI 140. The mixed signal 161 could represent the conference. One or more encoders 124 (FIG. 1B), based on CCDB (step 174), may grab and/or receive the mixed output 128 (which may be derived from mixed signal 161), and encode the mixed output 128 to form the compressed audio signal 117 (FIG. 1B) in step 194. The compressed audio signal 117 is then broadcasted onto the CACI 110. Finally, in step 196, the endpoints 1110*aa-nk* grab and/or receive the mixed compressed audio signal via the NI 1142 and networks 1130*a-k*.

The steps of the method 170 have been presented in an order that facilitates understanding the method. However, the steps of the method 170 can be performed in any order. Since some endpoints, according to the information stored in CCDB (step 174), may only be able to talk and some may only be able to listen, some codecs 120 (associated with a talk only endpoint) may grab and/or receive the compressed signals 115 from a particular endpoint, and broadcast the compressed signals 117 (for other endpoints to listen to), while other codecs 120 may not grab or receive the compressed signals 115 (from their associated endpoint), but may nonetheless send the mixed compressed signals 117 to its associated endpoint.

FIG. 2 is an example of a CCDB. Each column represents a conference and the bridge 150 (FIG. 1A) that is associated with that conference. In FIG. 2, the participants are labeled 1-N+2, and the conferences are labeled A-X. The bridges used for the conference are labeled B1-Bz. French speaking participants are marked with an "F," and English speaking participants are marked with an "E." The English to French translator is marked with an "EF," and the French to English translator is marked with an "FE." The codecs in use are labeled C01-Ck. Cells marked "N" have a status of Normal, cells marked "S" have a status of Speak, and empty cells have a status of "None."

For example, column A 202 (i.e., conference A) uses bridge #3 (i.e., B3), and the first row 204 is participant #1 who is using codec #11 (C11) 206. The current example presents a case with five conferences. The first conference is conference A, which uses B3 as the bridge. Conference A has six participants, labeled 1, 2, 3, 4, 5, and 6, which use the codecs 120 (FIG. 1B) having numbers C11, C21, C13, C05, C07, and C06, respectively. In this conference, the connection status of the participants 1, 3, 5 (the English speaking individuals) and 6 (French to English translator) is "Normal" (N). The N connection status may mean that a participant can speak and listen to the conference. The bridge 150 associated with the conference, in this case bridge B3, grabs the decoded information 126 (FIG. 1B) from each decoder 122 (FIG. 1B) associated with one of the participants 1, 2, 3, 4, 5, and 6 so that the decoded information of these participants can be mixed with the other audio signals of the conference, and participants 1, 2, 3, 4, 5, and 6 can be heard. For each participant 1, 2, 3, 4, 5, and 6, the encoder 124 (FIG. 1B) associated with that participant grabs the mixed output 128 (FIG. 1B) of the bridge (B3) so that participants 1, 2, 3, 4, 5, and 6 can listen to the conference.

In conference A, the connection status of participants 2 and 4 (the French speaking persons) is "Speak" (S). The S connection status means that participants 2 and 4 can be heard in the conference but cannot listen to the conference. For each participant 2 and 4, the bridge 150 associated with the conference, in this case bridge B3, grabs the decoded information 126 from the decoder 122 associated with that participant so that the decoded information can be mixed with the other audio signals of the conference, and participants 2 and 4 can be heard.

A second exemplary conference, conference B, uses bridge B1. Conference B has six participants 1, 2, 3, 4, 5, and 7 that use codec numbers C11, C21, C13, C05, C07, and C17, respectively, and are connected to the conference. In this conference, the connection status of participants 1, 3, and 5 (the English speaking individuals) is S. Consequently, participants 1, 3, and 5 can be heard in the conference but cannot listen to the conference. The bridge 150 associated with the conference, bridge B1, grabs the decoded information 126 from the decoder 122 of participants 1, 3, and 5 so that their audio signals can be mixed with the rest of the audio signals of the conference allowing participants 1, 3, and 5 to be heard.

Continuing with conference B, the connection status of participants 2, 4 (the French speaking individuals) and 7 (English to French translator) is "Normal" (N). Thus, participants 2, 4, and 7 can both speak and listen to the conference. The speech of one of the participants 2, 4, and 7 is enabled by the bridge B1 grabbing the decoded information 126 from the decoder 122 associated with those participants. Conversely, the listening process of one of the participants is enabled by the encoder 124 associated with that participant grabbing the mixed output 128 of the bridge (B1).

The third exemplary conference, conference C, uses bridge B5, and has two participants 8 and 9, whom are using codecs having numbers C08 and C01, respectively. In this conference the connection status of both participants is "Normal" (N).

In the fourth exemplary conference, conference D, bridge B4 is used. Conference D has four participants 8, 9, 10, and 11, who are using codecs numbered C08, C01, C10, and C04, respectively. In conference D, the connection status of participants 8 and 9 is Speak (S). The S connection status means that participants 8 and 9 can be heard in the conference but cannot listen to the conference. For each participant 8 and 9, the bridge 150 associated with the conference, in this case bridge B4, grabs the decoded information 126 from the decoder 122 associated with that participant so that the decoded information can be mixed with the other audio signals of the conference, and participants 8 and 9 can be heard. The connection status of participants 10 and 11 is "Normal" (N). Consequently, for each of participants 10 and 11, bridge B4, grabs the decoded information 126 from the decoder 122 associated with that participant, and the encoder 124 of that participant grabs the mixed output 128 of the bridge B4.

The final exemplary embodiment, conference X, uses bridge Bz, and has 3 participants N, N+1 and N+2 who are using codecs numbered Cm, C1, and Ck, respectively. Conference X is a common conference where the connection status of all the participants is "Normal" (N).

The above example illustrates at least two special cases. The first case is a combination of conferences A and B, which is a conference of three English speaking individuals with a translator from French to English (FE) and French speaking individual with a translator from English to French (EF).

The second case is the combination of conferences C and D (where C is a sub-conference of D), which can be a case in which two individuals 8 and 9 are discussing an issue among themselves while their peers 10 and 11 can listen to them. The peers 10 and 11 can thus have an internal discussion between themselves without being heard by the individuals 8 and 9.

An instance of a participant in a conference may be a call to (or rather an instantiation of) an object representing a particular participant. The existence of an instance of a participant implies that the participant's connection status in the conference is not "None." In other embodiments, conferences may use connection statuses such as, but not limited to, "Exclusive" (E) and "Listening" (L). In E status, the participant is the only one that can be heard in the conference. Alternatively, L status allows the participant to listen to the conference without speaking.

One or both connection statuses, E and L, may be used in an embodiment with any one of, any combination of, or all of connection statuses M, N, and None. For example, one embodiment may include connection statuses N, E, L, and None while another embodiment may include M, N, E, S, and None.

In the present specification a connection change is any change in a current situation or configuration of the conference. The connection change can be, for example, to start a conference, terminate a conference, add a participant, or mute a participant. Based on the information embedded in the CCDB, the MCS 1170 (FIG. 1A) may perform connection changes by sending commands to the decoder 122 and the encoder 124 of the codec 120 that determine which information to grab from the CACI 110 (FIG. 1A) and/or the DACI 140 (FIG. 1B), respectively, and/or by sending commands to the bridge 150 determining which information to grab from the DACI 140.

The present invention is not limited to any specific type of database, and may use types of databases other than the ones explicitly disclosed above. For example, the database CCDB may include a bank of databases, having one database for each participant. The database of a participant may have the participant's connection status in each conference. Alternatively, or in addition to this bank of databases, CCDB may have a bank of databases having one database for each conference. Each database may include the participants that are involved with that conference. The various databases may be related to each other enabling the controller to move from one database to the other.

Figure 3:
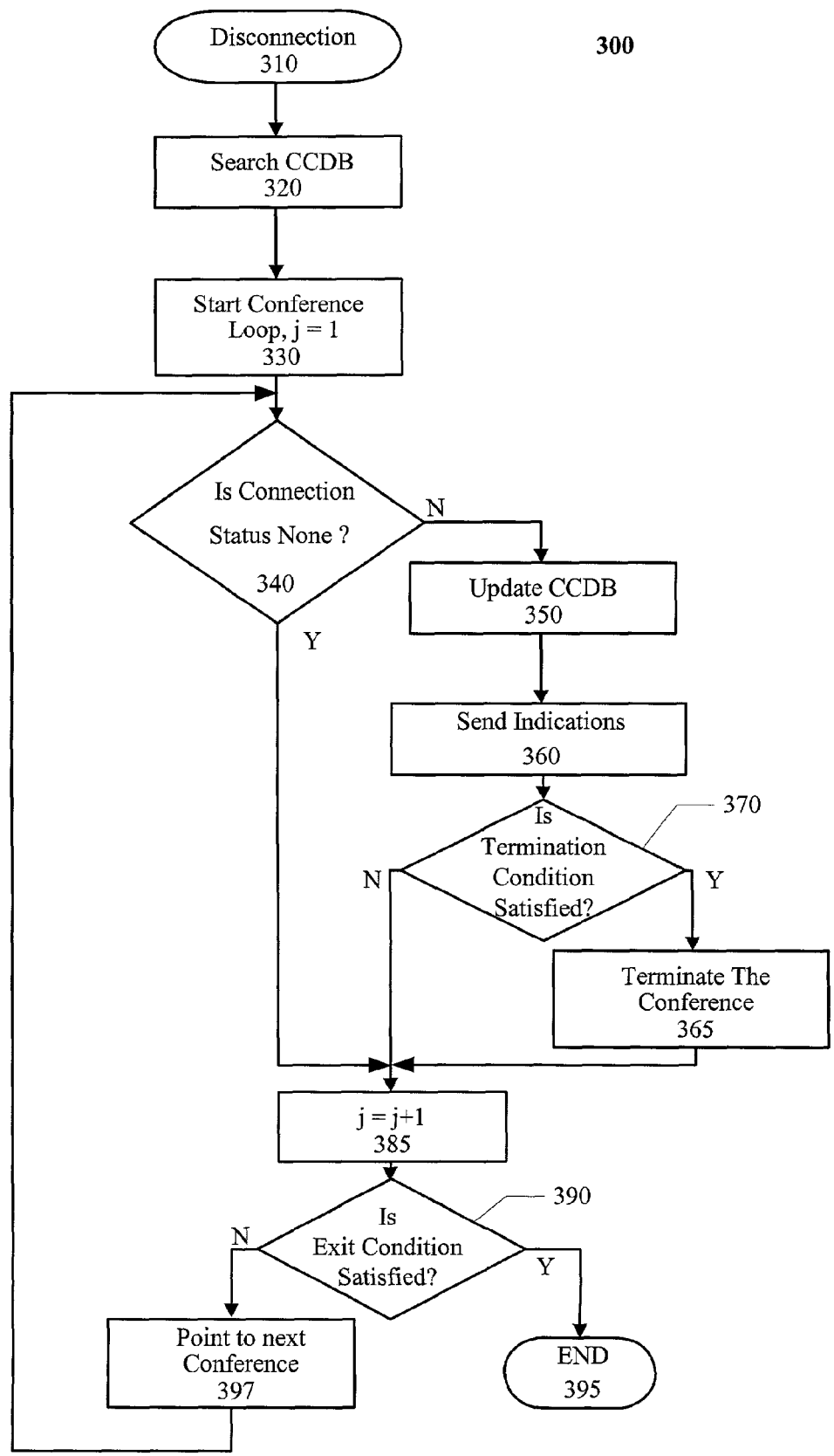
FIG. 3 is a flow diagram showing the steps of an exemplary method for disconnection of a participant.

FIG. 3 is a flowchart showing the steps of an exemplary method 300 for disconnecting a participant. The method 300 updates the conference connections that are affected by the participant disconnecting. Further, the method 300 ensures that the participant is no longer connected to any conference. Also, a participant being disconnected can place a conference in a state where the conference should be terminated (because, for example, there is only one participant left in that conference). Consequently, the method 300 also ensures that any conference that should be terminated as a result of the disconnection is actually terminated.

When the MCS 1170 (FIG. 1A) receives an information signal, either from the host 1200 (FIG. 1A) or from NI 1142 (FIG. 1A), that a participant has been disconnected, in step 310, the MCS 1170 starts a disconnection routine associated with the method 300. In step 320, the MCS 1170 searches for the CCDB entry related to the participant that has been disconnected. In this step the appropriate row in the CCDB of FIG. 2, for example, is found.

Then in step 330, the MCS 1170 starts the conference loop, which is a loop including all conferences that are currently managed by the MCU. The loop may be searched conference by conference. For example, MCS 1170 may check how many conferences are currently managed by the MCU and may store this parameter, K. Then the MCS 1170 may give the value 1 to a variable j and move along the appropriate row, in the CCDB of FIG. 2, for example, to the first conference found.

In step 340, the MCS 1170 may check if the connection status of the disconnected participant in the current conference is "None." If it is different than "None," then the MCS 1170 moves to step 350. Otherwise, MCS 1170 moves to step 385. In step 350, the MCS 1170 may update the CCDB of FIG. 2, for example, with the new situation, (e.g., changes the connection status of the participant to "None"). Subsequently, in step 360 MCS 1170 may send signals to the rest of the participants in the conference indicating that one of the participants has been disconnected.

Then, the MCS 1170 may perform a check, step 370, for whether a termination condition is met. The termination condition may occur when there are less than two participants. Alternatively, the termination condition may occur when the number of participants falls below a predetermined threshold. The predetermined threshold may be determined by financial or other considerations, for example. The termination condition may include a request to terminate the conference, which may be required in addition to or instead of the number of participants falling below a predetermined number. Termination of a conference can be done by the method described in conjunction with FIG. 4. The termination condition may be a logical function of several termination conditions, and may change dynamically according to a termination policy. If the termination condition is met, the MCS 1170 may move to step 365 and terminate the conference. However, if the termination condition is not met (for example, if there are more than two participants), the MCS 1170 enables the continuation of the conference and moves to step 385.

In step 385, the MCS 1170 may increase the variable j by 1, and check, in step 390, if an exit condition for exiting the loop is met. For example, an exit condition may be a condition indicative of all loops being checked (e.g., j=K). The MCS 1170 then moves to step 395 and exits the loop, thereby, terminating the disconnection method. Otherwise, in step 397 MCS 1170 moves to the next conference in the row and returns to step 340. Although in the example of the method 300 the participant is disconnected from all the conferences, a similar method could be used for disconnecting the participant from all but one or more specified conferences.

Figure 4:
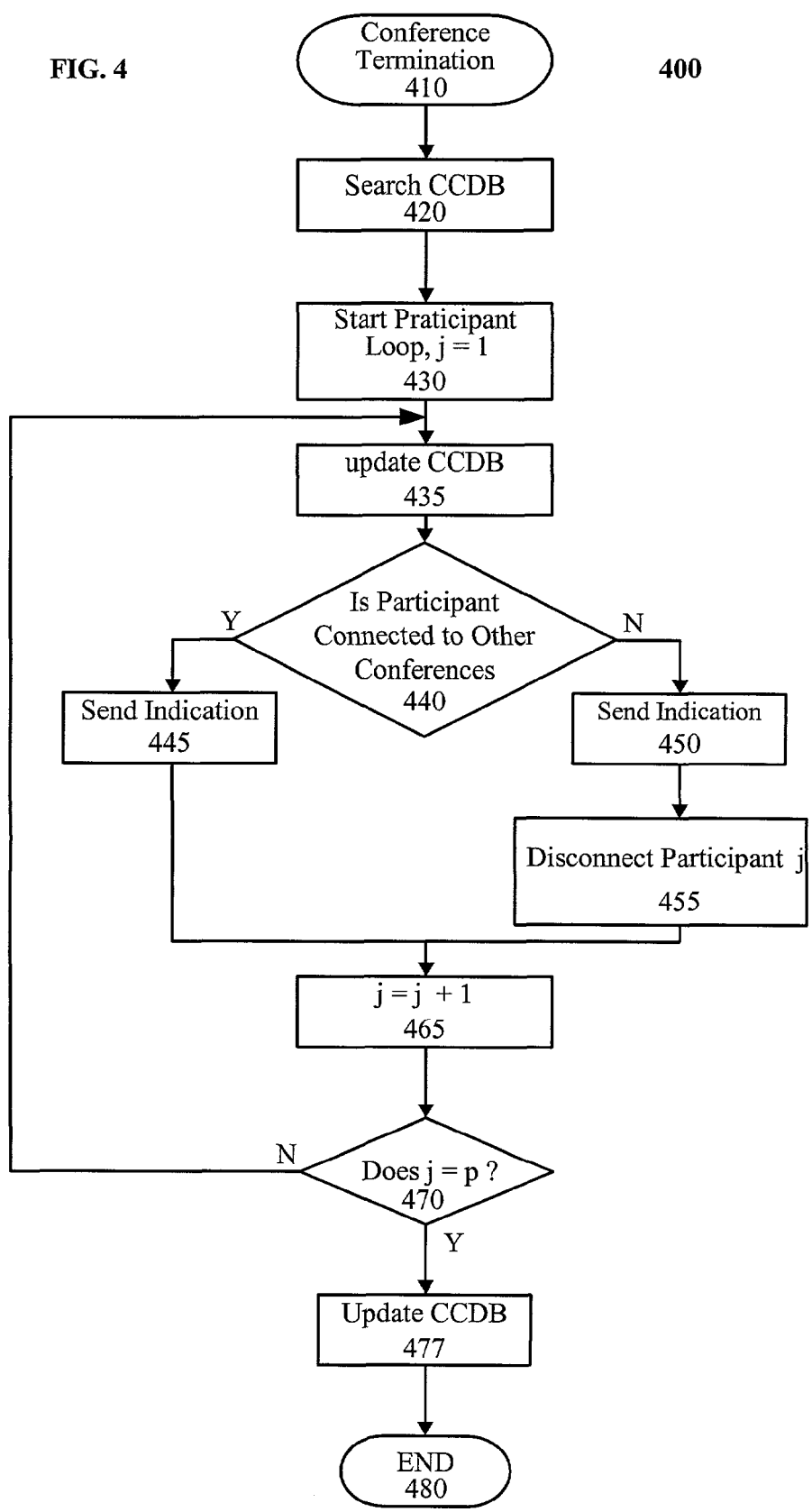
FIG. 4 is a flow diagram showing the steps of an exemplary method for terminating a conference.

FIG. 4 is a flow diagram illustrating the steps of an exemplary method 400 for terminating a conference (i.e., step 365 of FIG. 3). The method 400 notifies all participants of a conference that the conference is being terminated. If a participant is connected to the conference, the method 400 also disconnects the participant. After terminating the conference, the CCDB needs to be updated so that MCS 1170 (FIG. 1A) no longer sends control signals related to the terminated conference. Consequently, after notifying and disconnecting the participants, as appropriate, the method 400 updates the CCDB to reflect the conference being disconnected.

When the MCS 1170 receives a command to terminate a conference in step 410, the MCS 1170 may start the termination routine of method 400. In step 420, the MCS 1170 searches for the CCDB entry related to the conference to be terminated. For example, this step finds the appropriate column in the CCDB of FIG. 2.

Then in step 430, the MCS 1170 starts the participant loop, which may be a loop that includes all participants that are currently connected to the conference. The MCS 1170 may check how many participants are currently connected to the conference and store the number of participants (parameter P). Then MCS 1170 (FIG. 1) may give a value 1 to a variable j, and move along the appropriate column (or conference) to the first participant. Then in step 435, the MCS 1170 updates the CCDB, with the new conference state (e.g., the connection status of the participant, which is associated with the variable j, is changed to "None").

In step 440, the MCS 1170 checks for a termination condition for the participant j. For example, a termination condition may be when the participant is not connected to any other conference. The check may be performed by observing the corresponding row of the participant in the CCDB. Unless the participant has any relation to or any instance in any other conference, then the termination condition of participant j is met. In this example, if the participant has any instance in any other conference, then the MCS 1170 moves to step 445, else the MCS 1170 moves to step 450. In step 450, the MCS 1170 sends an information signal to participant j that the conference is terminated and in step 455 disconnects participant j. In another exemplary method, the MCS 1170 may have another termination condition or policy to disconnect a participant. The termination condition may be dynamic and may require a request for termination for the participant and/or other entity in addition to or as an alternative to the participant having a status of "None" in all conferences. If the termination condition is not met, for example, if the participant is connected to any other conference 440, then the MCS 1170 sends the operator and/or the participant an information signal, in step 445, that the current conference is terminated and the method 400 moves to step 465.

In step 465, the MCS 1170 may increase variable j by 1 and check, in step 470, whether j=P. If j=P, the MCS 1170 may move to step 477 and remove the appropriate column from the CCDB. Next, the method 400 moves to step 480, and finishes the conference termination. Otherwise (if j≠P), the MCS 1170 will return to step 435 where the next participant in the column is processed.

Those skilled in the art will appreciate that the MCS 1170 can be any one of or any combination of software, hardware, and/or firmware. If the MCS 1170 is software, the MCS 1170 may reside in the host computer of the associated MCU. Alternatively, if the MCS 1170 is hardware, the MCS 1170 may be an additional unit located in the MCU.

Furthermore, those skilled in the art will appreciate that the CCDB can be implemented in a single database or in several related databases. For example, the CCDB may be located in a bank of databases having one database per each participant, which may include the connection status of said participant in every conference that is currently controlled by the MCU and/or the connection parameters of the participant.

In the description and claims of the present application, each of the verbs, "comprise," "include," "have," and conjugations thereof, are used to indicate that the object or objects of the verb are not necessarily a complete listing of members, components, elements or parts of the subject or subjects of the verb. The present invention has been described using detailed descriptions of methods thereof that are provided by way of example and are not intended to limit the scope of the invention. The described methods comprise different features, not all of which are required in all embodiments of the invention. Some embodiments of the present invention utilize only some of the features or possible combinations of the features. Variations of embodiments of the present invention that are described and embodiments of the present invention having different combinations of features noted in the described embodiments will occur to persons of the art. The scope of the invention is limited only by the following claims.

What is claimed:

1. A method for controlling multiple simultaneous videoconferences of a plurality of participants, the method comprising:
   creating a cross conference database that comprises information comprising connection parameters and connection statuses for the plurality of participants; and
   establishing with a multipoint control unit (MCU) videoconferences of the plurality of participants according to the information in the cross conference database, wherein at least one participant can participate in two or more videoconferences simultaneously on different conferencing bridges and have different connection statuses in at least two of the two or more videoconferences as determined by the cross conference database.

2. The method of claim 1, further comprising:
   affecting a change in the connection parameters or the connection statuses;
   detecting all participants and all videoconferences affected by the change;
   updating the cross conference database to reflect the change; and
   implementing the change in the established videoconferences.

3. The method of claim 2, further comprising notifying each of the participants affected by the change before the change is performed.

4. The method of claim 1, wherein the connection parameters comprise parameters of codecs each of which is associated with a participant.

5. The method of claim 1, wherein the connection parameters comprise parameters of bridges each of which is associated with a conference.

6. The method of claim 1, wherein at least one of the connection statuses is associated with a participant in the videoconferences.

7. The method of claim 1, wherein the connection status is selected from the group consisting of normal, none, exclusive, mute, force, speak, and listen.

8. A method for establishing multiple simultaneous videoconferences of a plurality of participants, the method comprising:
   retrieving a first information from a cross conference database, wherein the first information comprises connection parameters and connection statuses for a first participant in a first videoconference;
   utilizing the first information to establish, with a multipoint control unit (MCU), a first videoconference on a first conferencing bridge including the first participant and one or more second participants;
   retrieving a second information from a cross conference database, wherein the second information comprises connection parameters and connection statuses for the first participant in a second videoconference; and
   utilizing the second information to establish, with a multipoint control unit (MCU), a second videoconference on a second conferencing bridge including the first participant and one or more third participants, wherein the first information comprises different information than the second information and the first videoconference and second videoconference overlap in time.

* * * * *

UNITED STATES PATENT AND TRADEMARK OFFICE
CERTIFICATE OF CORRECTION

| | | |
|---|---|---|
| PATENT NO. | : 8,805,928 B2 | Page 1 of 1 |
| APPLICATION NO. | : 10/144561 | |
| DATED | : August 12, 2014 | |
| INVENTOR(S) | : Potekhin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1921 days.

Signed and Sealed this
Twenty-fourth Day of November, 2015

Michelle K. Lee
*Director of the United States Patent and Trademark Office*